(12) United States Patent
Cunningham et al.

(10) Patent No.: US 8,275,585 B2
(45) Date of Patent: Sep. 25, 2012

(54) SPHERICAL ELASTOMERIC BEARING WITH IMPROVED SHIM THICKNESS

(75) Inventors: Robert Cunningham, Stamford, CT (US); Francis Edward Byrnes, White Plaines, NY (US)

(73) Assignee: Sikorsky Aircraft Corporation, Stratford, CT (US)

(*) Notice: Subject to any disclaimer, the term of this patent is extended or adjusted under 35 U.S.C. 154(b) by 1063 days.

(21) Appl. No.: 12/110,309

(22) Filed: Apr. 26, 2008

(65) Prior Publication Data

US 2009/0268997 A1  Oct. 29, 2009

(51) Int. Cl.
*G06F 17/50* (2006.01)
(52) U.S. Cl. .............................. 703/2; 384/602; 403/135
(58) Field of Classification Search ...... 703/2; 384/602; 403/135
See application file for complete search history.

(56) References Cited

U.S. PATENT DOCUMENTS

| | | | |
|---|---|---|---|
| 2,051,864 A | 8/1936 | Knox et al. | |
| 2,066,187 A | 12/1936 | Piron | |
| 2,068,279 A | 1/1937 | Piron | |
| 2,069,270 A | 2/1937 | Piron | |
| 2,126,707 A | 8/1938 | Schmidt | |
| 2,127,219 A | 8/1938 | Hirshfeld | |
| 2,149,297 A | 3/1939 | Knox | |
| 2,158,028 A | 5/1939 | Burke | |
| 2,427,936 A | 9/1947 | Wales, Jr. | |
| 3,216,593 A | 11/1965 | Reuter et al. | |
| 3,389,557 A | 6/1968 | Backe et al. | |
| 3,467,353 A | 9/1969 | Peterson et al. | |
| 3,700,352 A | 10/1972 | Gorndt | |
| 3,721,507 A | 3/1973 | Monteleone | |
| 3,759,632 A | 9/1973 | Rybicki | |
| 4,120,610 A | 10/1978 | Braswell et al. | |
| RE30,262 E | 4/1980 | Schmidt | |
| 4,419,398 A | 12/1983 | Coffy et al. | |
| 4,566,856 A * | 1/1986 | Miller | 416/134 A |
| 4,715,559 A | 12/1987 | Fuller | |
| 5,267,320 A | 11/1993 | Fukumizu | |
| 5,366,324 A | 11/1994 | Arlt et al. | |
| 5,482,406 A | 1/1996 | Arlt, III | |
| 5,601,408 A * | 2/1997 | Hunter et al. | 416/134 A |
| 5,627,896 A | 5/1997 | Southward et al. | |
| 5,628,586 A | 5/1997 | Arlt, III | |
| 5,629,986 A | 5/1997 | Shoureshi | |
| 5,641,248 A | 6/1997 | Arlt, III | |
| 5,658,095 A | 8/1997 | Arlt et al. | |
| 5,838,802 A | 11/1998 | Swinbanks | |

(Continued)

FOREIGN PATENT DOCUMENTS

DE  465394  5/1937

(Continued)

OTHER PUBLICATIONS

Kiran Singh, "The Servo Flap Controlled Rotor," http://www.helis.com/howflies/servo.php, Jul. 20, 2006.

(Continued)

*Primary Examiner* — Dwin M Craig
(74) *Attorney, Agent, or Firm* — Carlson, Gaskey & Olds PC

(57) ABSTRACT

An elastomeric spherical bearing includes a multiple of shims, at least two of which have different thicknesses. In one exemplary embodiment, each of the shims has a different thickness with an essentially equivalent stress on each shim.

8 Claims, 7 Drawing Sheets

U.S. PATENT DOCUMENTS

| | | | |
|---|---|---|---|
| 5,845,236 A | 12/1998 | Jolly et al. | |
| 6,229,898 B1 | 5/2001 | Goodman | |
| 6,481,892 B1 | 11/2002 | Agostini | |
| 6,568,906 B2 | 5/2003 | Gharibian et al. | |
| 6,666,648 B2 | 12/2003 | Bernhard et al. | |
| 6,695,583 B2 | 2/2004 | Schmaling et al. | |
| 6,772,074 B2 | 8/2004 | Millott et al. | |
| 6,803,095 B1 | 10/2004 | Halladay et al. | |
| 6,856,920 B2 | 2/2005 | Millott et al. | |
| 6,860,015 B2 | 3/2005 | Muylaert | |
| 6,889,965 B2 | 5/2005 | Loftus et al. | |
| 7,003,380 B2 | 2/2006 | MacMartin et al. | |
| 7,097,169 B2 | 8/2006 | Mueller | |
| 2008/0256788 A1* | 10/2008 | Glazebrook | 29/700 |

FOREIGN PATENT DOCUMENTS

| | | |
|---|---|---|
| DE | 680988 | 9/1939 |
| EP | 0773531 | 5/1997 |
| FR | 934336 | 5/1948 |
| GB | 828065 | 2/1960 |

OTHER PUBLICATIONS

"Fast Acting Large Stroke Actuator", http://www.midi.com/pdf_html/Fast_acting_lrg_stroke_actuator.htm, Jul. 20, 2006.

Jinwei Shen Mao Yang, and Inderjit Chopra, "Swashplateless Helicopter Rotor with Trailing Edge Flaps for Flight and Vibration Control," Journal of Aircraft, vol. 43, No. 2, Mar.-Apr. 2006, pp. 346-352.

* cited by examiner

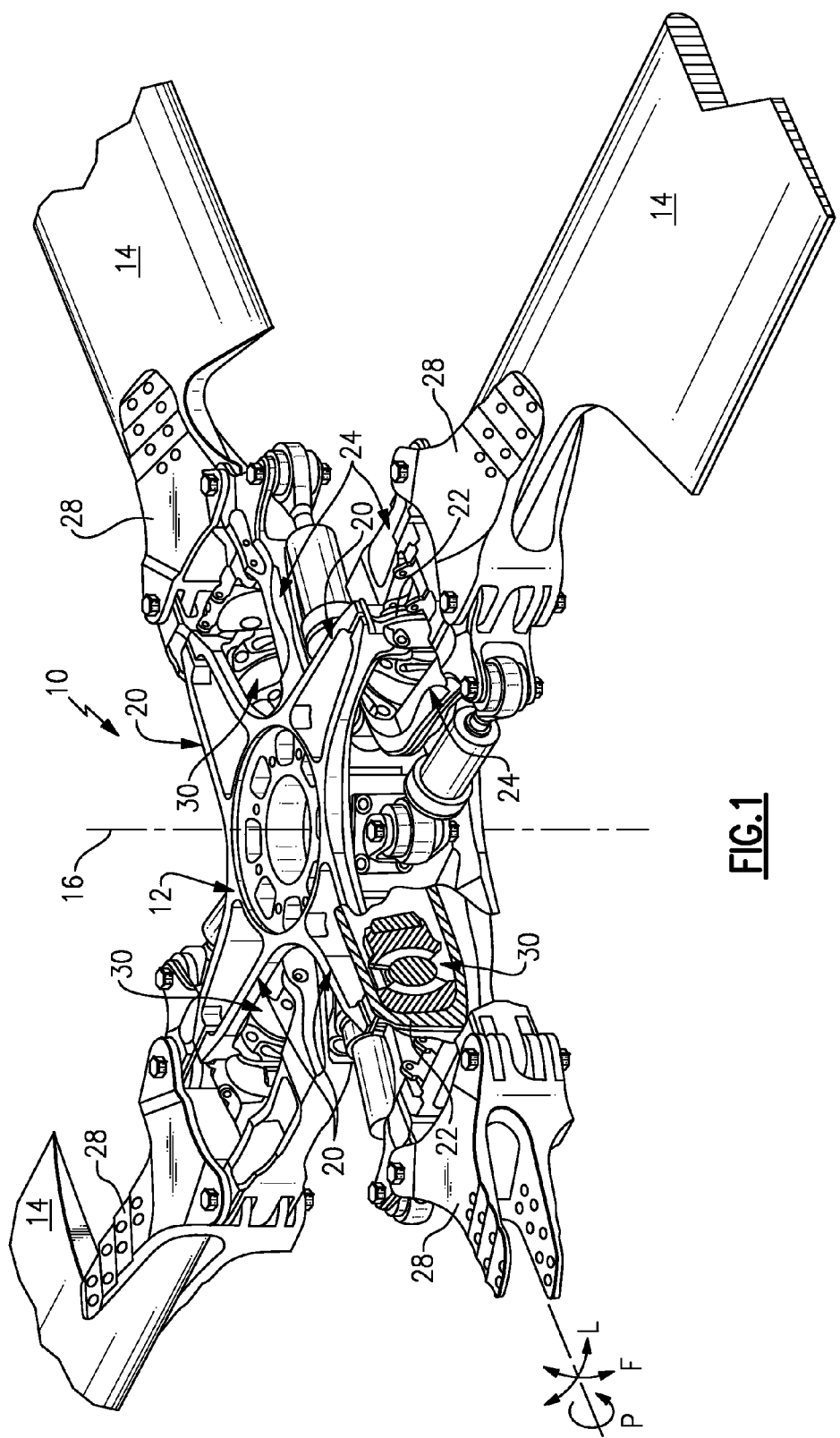

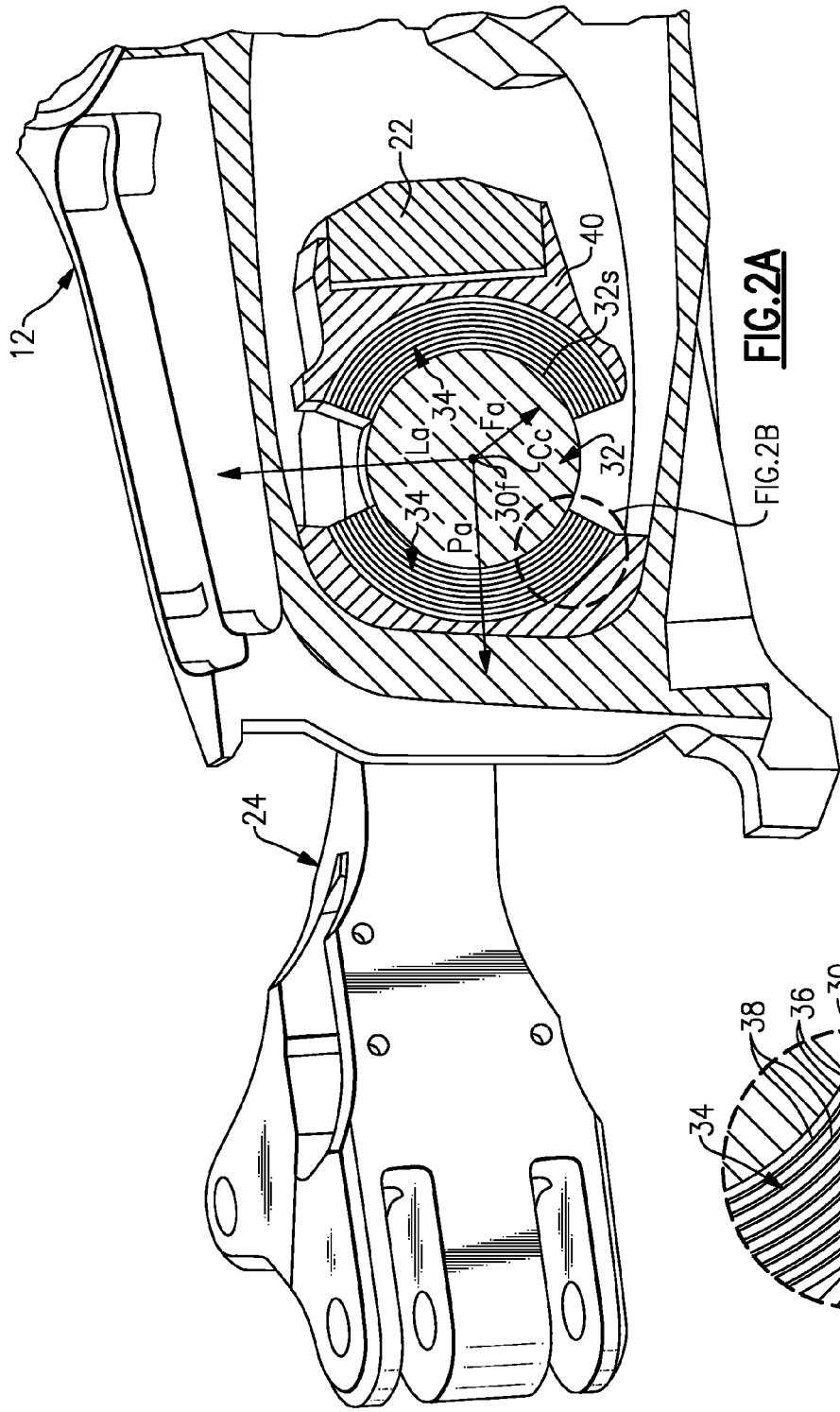
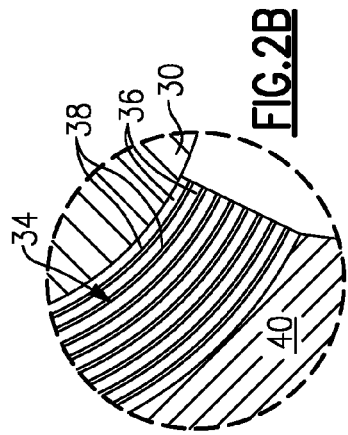

SPHERICAL ELASTOMERIC BEARING WITH IMPROVED SHIM THICKNESS

BACKGROUND

The present invention relates to an elastomeric spherical bearing.

One goal of elastomeric spherical bearing design is the smallest/lightest package that meets the desired design life requirements. Conventional spherical elastomeric bearing optimization procedures have only optimized the elastomeric layers and incorporated single thickness non-extensible layers such as metal shims throughout the entire bearing.

SUMMARY

An elastomeric spherical bearing according to an exemplary aspect of the present invention includes a multitude of shims, each of said multitude of shims mounted between at least two of the multiple of elastomeric layers, a first shim of the multitude of shims having a first thickness and a second shim of the multitude of shims having a second thickness, the second thickness different than the first thickness.

A method of calculating a nonresilient shim thickness for a spherical elastomeric bearing according to an exemplary aspect of the present invention includes Determining a first thickness of a first of a multitude of nonresilient shim layers to satisfies a first set of criteria. Determining a second thickness of a second of the multitude of nonresilient shim layers outboard of the first of the multitude of nonresilient shim layers to satisfies a second set of criteria, the second thickness different than the first thickness.

A method of calculating a nonresilient shim layer thickness for a spherical elastomeric bearing according to an exemplary aspect of the present invention includes determining a first shim thickness of a first of a multitude of nonresilient shim layers in the spherical elastomeric bearing, each of the multitude of nonresilient shim layers sandwiched between a first pair of elastomeric layers. Determining a elastomeric layer thickness for the first pair of elastomeric layers. Modifying the first shim thickness and the elastomeric layer thickness in response to an addition of a second a of the multitude of nonresilient shim layers and a second pair of elastomeric layers outboard of the first of the multitude of nonresilient shim layers and the first pair of elastomeric layers, the modifying continuing until each of the multitude of nonresilient shim layers have a generally equivalent stress.

BRIEF DESCRIPTION OF THE DRAWINGS

The various features and advantages of this invention will become apparent to those skilled in the art from the following detailed description of the currently disclosed embodiment. The drawings that accompany the detailed description can be briefly described as follows:

FIG. 1 is a perspective view a rotor head assembly utilizing an elastomeric bearing according to one non-limiting embodiment of the present invention;

FIG. 2A is an enlarged broken-away perspective view of the elastomeric bearing in combination with a rotor assembly yoke and shear segment of the rotor hub assembly of FIG. 1;

FIG. 2B depicts an enlarged view of the elastomeric laminates of the elastomeric bearing of FIG. 2A;

DETAILED DESCRIPTION OF THE DISCLOSED EMBODIMENT

Figure 3:
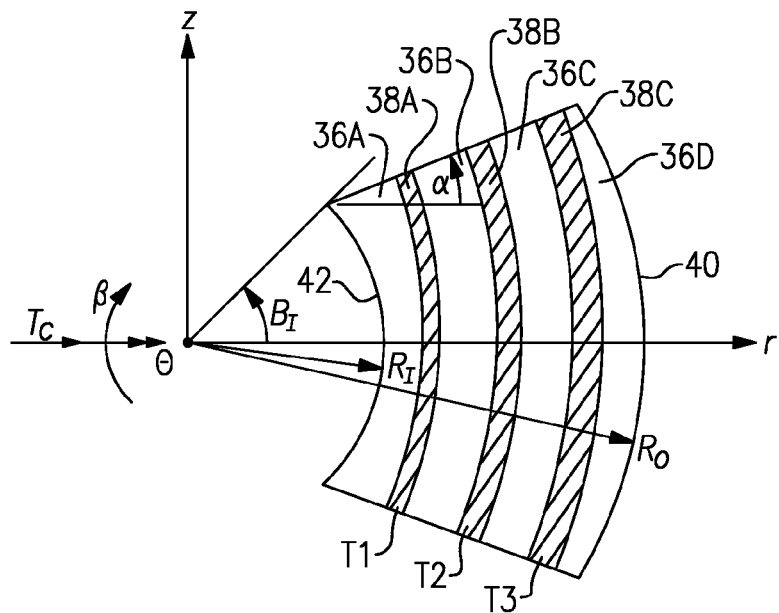
FIG. 3 is a schematic sectional view of a spherical elastomeric layer of the elastomeric bearing design envelope.

Referring to FIG. 1, a rotor hub assembly 10 typical of a rotary-wing aircraft includes a hub retention member 12 which drives a multitude of rotor blade assemblies 14 about an axis of rotation 16.

The hub retention member 12 includes a multitude of radial spokes 20 and shear segments 22. Each shear segment 22, in combination with its respective radial spokes 20, form a structural loop for accepting a rotor assembly yoke 24. The yoke 24 is generally C-shaped and circumscribes, in looped fashion, the respective shear segment 22. The yoke 24 is disposed in combination with a cuff structures 28 which, in turn, mount to the root end of each rotor blade assembly 14.

A spherical elastomeric bearing assembly 30 is interposed between each rotor assembly yoke 24 and the respective shear segment 22 to accommodate the multi-directional rotation of the rotor blade assembly 14.

Referring to FIG. 2A, the spherical elastomeric bearing 30 is shown in combination with a rotor assembly yoke 24 and a respective shear segment 22. It should be understood that although a particular rotor hub application is illustrated in the disclosed non-limiting embodiment, elastomeric bearing for any application including but not limited to aerospace, heavy machinery, and civil engineering (bridges, buildings, etc.) will benefit herefrom.

The spherical elastomeric bearing 30 includes a central bearing element 32 having a spherical bearing surface 32s which defines a bearing focal point 30f. The bearing focal point 30f defines the flap, lead-lag and pitch axes, Fa, La, and Pa, respectively, about which the rotor blade assembly articulates (FIG. 1).

To the spherical surface 32s is bonded discrete spherical elastomeric elements 34 about the bearing focal point 30f. Furthermore, each spherical elastomeric element 34 includes a multiple of alternating layers (see FIG. 2B) of elastomer 36 and nonresilient shims 38, respectively, which are disposed at increasing radii from the bearing focal point 30f and have a center of curvature $C_c$ which is coincident therewith.

Each nonresilient shim 38 of the elastomeric spherical bearing 30 is tailored to an improved, and in one exemplary embodiment an optimized, thickness as will be further described below. Generally, each nonresilient shim 38 away from the bearing focal point 30f increases in thickness. As each nonresilient shim 38 is of an improved, and in an exemplary embodiment optimized, thickness the entire spherical elastomeric bearing size envelope and weight is improved and may be minimized. The improvement occurs because one or more of the nonresilient shims 38 has a calculated and fabricated size that is different from the thickness of another of the nonresilient shims 38. Optimization occurs, e.g., when each of the thicknesses of each of the nonresilient shims 38 is calculated according to certain criteria as discussed below.

Referring to FIG. 3, the elastomeric spherical bearing 30 is schematically illustrated such that nomenclature may be defined. The elastomeric spherical bearing 30 includes an outwardly facing convex surface 40 and an inwardly facing concave surface 42. A representative number of elastomer layers 36A, 36B, 36C, 36D sandwich a number of nonresilient shims 38A, 38B, 38C therebetween. It should be understood that any number of layers may be included and calculated according to the disclosure herein. It is noted that superscript or subscript "i" refers to elastomeric layers, while superscript or subscript "j" refers to shim layers.

Symbols (see FIGS. 3, 4, 5, 6A and 6B)

$$\hat{T}_e = \text{Average Elastomer Thickness } \frac{(T_i + T_{i+1})}{2} \text{(in)}$$

$T_s$=Shim Thickness $T_s^j$ (in)
$\hat{T}_s$=Average Shim Thickness (in)
$\mu$=Shim Poison Ratio
E=Shim Modulus of Elasticity (psi)
$R_s$=Shim Median Spherical Radius $R^j$ (in)

$$G = \text{Average Elastomer Shear Modulus } \frac{(G_i + G_{i+1})}{2} \text{(psi)}$$

$B_I$=Bearing Inner Wrap Angle (deg)
$B_o$=Bearing Outer Wrap Angle (deg)
$N_s$=Total Number of Shims
$B_s$=Outer Wrap Around Angle of Shim $B_s^j$ (deg)
D=Shim Bending Stiffness Term (lb-in)
$B_{ET}$=Shim Geometric Stiffness Term (in)
$\gamma$=Average Elastomer Compression Induced Shear Strain (in/in)/100
$T_T$=Total Bearing Elastomer Thickness (in)
Q=Averaging Coefficient of Bearing (non-dimensional)
$\nu$=Averaging Coefficient of Elastomer To Shim Context (non-dimensional)
$L_L$=Unsupported Spherical Arc of Shim $L_L^i$ (see FIG. 4)
$Y_Y$=Radial Deflection of Shim $Y_Y^i$ (see FIG. 4)
$\sigma_\theta$=Shim Hoop Stress $\sigma_{\theta i}$ (psi)
$D_P$=Differential Resultant Pressure Load On Unsupported Spherical Arc of Shim $L_L^i$
$T_c$=Axial Compressive Load (lb)
$\theta$=Torsional Motion Angle (deg)
$\beta$=Cocking Motion Angle (deg)
$T_c \cdot \sin \beta$=Radial Load (lb)
$R_I$=Bearing Inner Radius (in)
$R_o$=Bearing Outer Radius (in)
$T_e^i$=Elastomer Thickness (in)
$\alpha$=Bearing Outer Taper Angle (deg)

Shim Stress Design Module Equations $$R_R = R_s \cdot \sin(B_s) \tag{1}$$

$$D = \frac{E \cdot T_s^3}{12 \cdot (1 - \mu^2)} \tag{2}$$

$$B_{ET} = \left[\frac{E \cdot T_s [\cos(B_s)]^2}{4 \cdot D \cdot R_R^2}\right]^{1/4} \tag{3}$$

$$D_P = 2 \cdot \gamma \cdot G \cdot \frac{L_L}{T_e} \tag{4}$$

$$L_L = (B_I - B_o) \frac{\pi}{180} \left(\frac{R_s}{N_s}\right) Q \cdot \alpha \tag{5}$$

$$Q = \frac{T_s}{\left(\frac{T_T}{N_s + 1}\right)} \tag{6}$$

$$\nu = \frac{T_T}{N_s \cdot \hat{T}_s + T_T} \tag{7}$$

$$Y_Y = \frac{D_P}{10} \left(\frac{1}{2 \cdot D \cdot B_{ET}^3}\right) \tag{8}$$

$$\sigma_\theta = Y_Y \left[\frac{E}{R_R} \cos(B)\right] \tag{9}$$

Equations 1-9 are combined to generate the following equation:

$$\sigma_\theta = \frac{4 \cdot (B_I - B_o) \cdot \gamma \cdot G \cdot D \cdot \pi \cdot E \cdot \cos(B_s) \cdot R_s}{1800 \cdot T_e \cdot R_s \cdot \sin(B_s) \cdot N_s} \cdot \frac{T}{\left(\frac{T_T}{N_s + 1}\right)} \cdot \tag{10}$$

$$\frac{T_T}{N_s \cdot \hat{T}_s + T_T} \cdot \left[\left[\frac{E \cdot T_s [\cos(B_s)]^2}{4 \cdot \frac{E \cdot T_s^3}{12 \cdot (1-\mu^2)} \cdot [R_s \cdot \sin(B_s)]^2}\right]^{1/4}\right]^{-3}$$

Figure 7A:
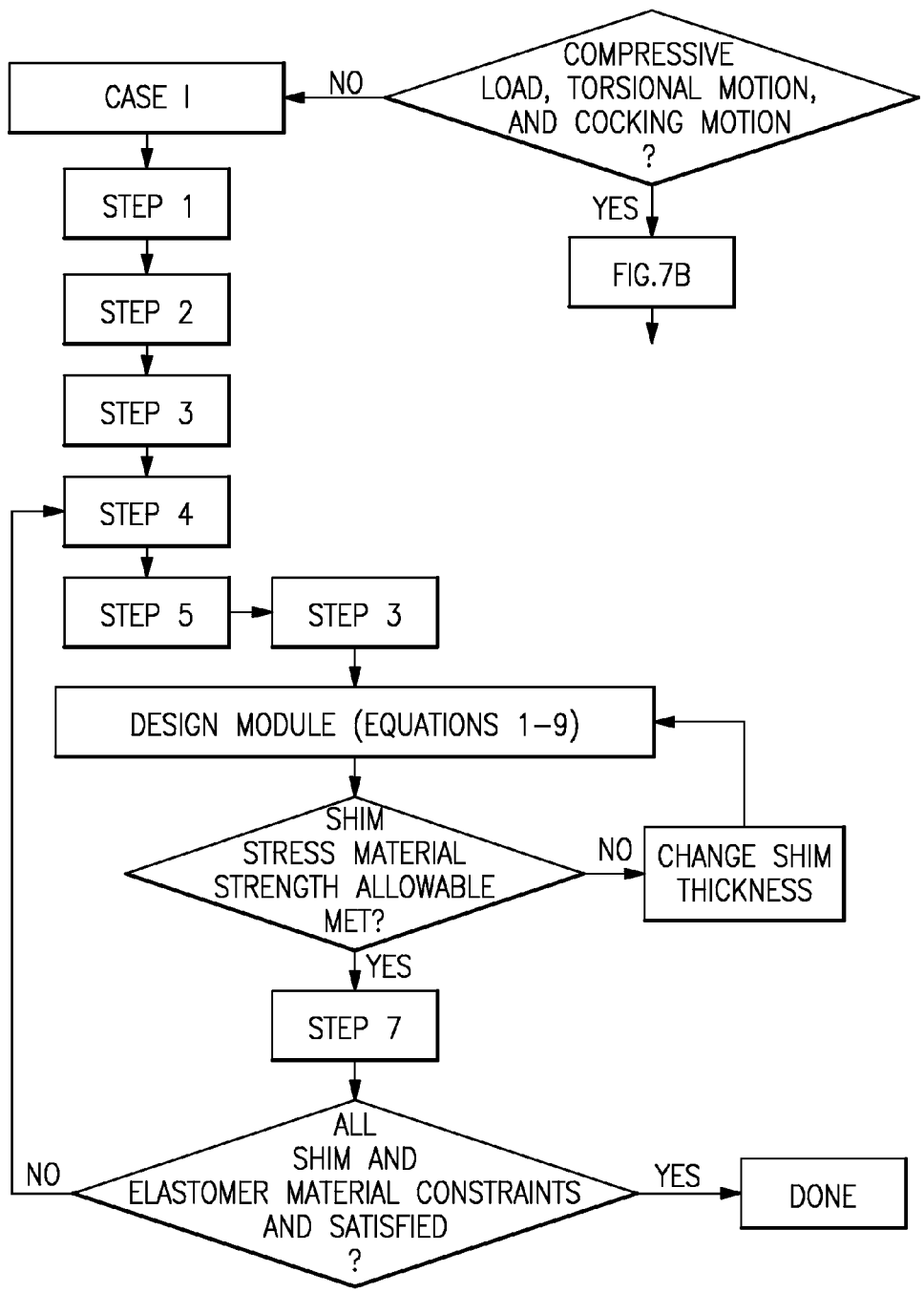
FIG. 7A is a flow chart illustrating a calculation procedure for calculation of Compressive Load $T_c$ And Torsional Motion ($\theta$) according to one non-limiting embodiment.

Referring to FIG. 7A, utilizing the Equations described above, one calculation procedure according to one non-limiting embodiment of the present invention is as follows:

Calculate Shim Stress

Case I

Compressive Load $T_c$ And Torsional Motion ($\theta$) Calculation

Step 1. Determine Loads and Motions.
  a. Determine the axial load. The axial load acts in a direction parallel to the bearing Z axis of rotation. For rotary-wing aircraft, this is generally the centrifugal force from the rotor blade 14.
  b. Determine the radial load. The radial load acts in the R, radial direction. This is generally the shear load on the rotor blade 14.
  c. Determine the vibratory pitch motion ($\theta$) angle. This motion rotates about the Z axis and is sometimes referred to as the torsional rotation. This motion is a vibratory motion. The angle is a plus or minus motion from the origin.
  d. Determine the flapping (cocking $\beta$) motion angle. (used in Case II below).
  e. Determine shim stress allowable (in psi).

Step 2. Enter spherical elastomeric bearing dimensions. Inner radius ($R_I$), Inner Angle ($B_I$), Side Angle ($\alpha$) sometimes referred to as outer taper angle, and Elastomer modulus of elasticity (E).

Figure 4:
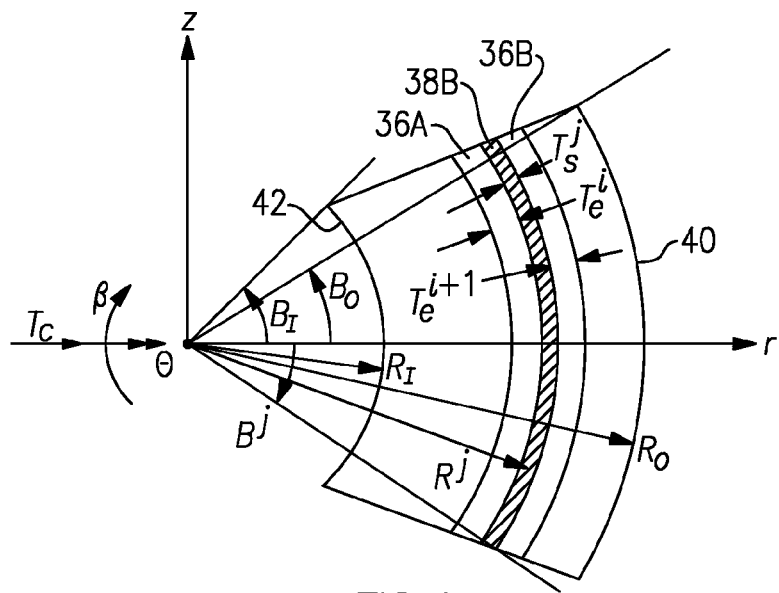
FIG. 4 is a schematic sectional view of a spherical elastomeric bearing with details of one inner elastomeric layer, one outer elastomeric layer and a nonresilient shim therebetween.
Figure 5:
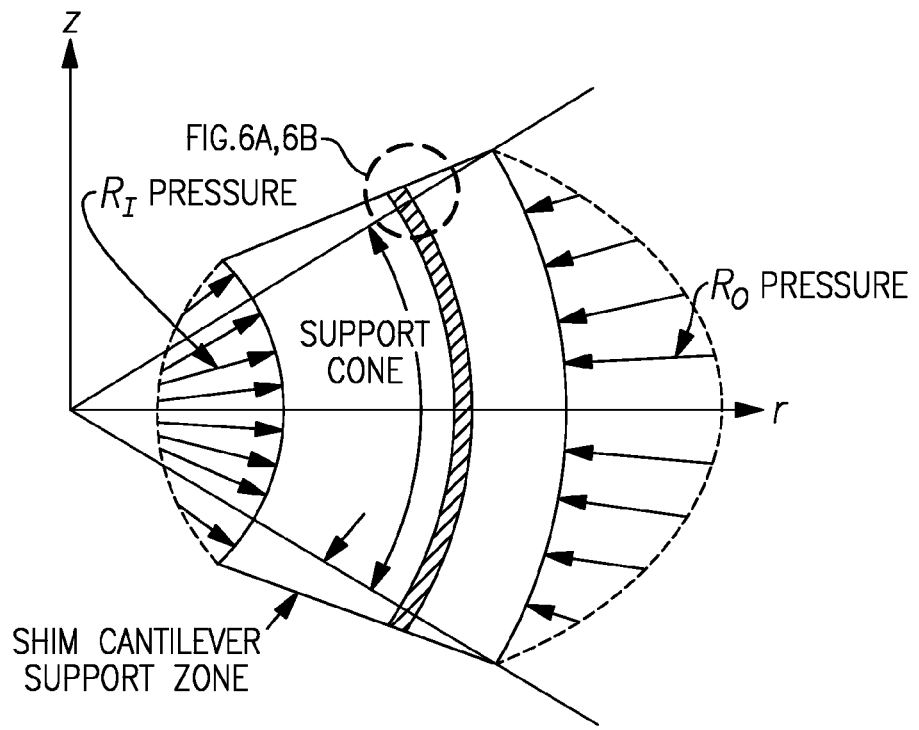
FIG. 5 is an expanded schematic sectional view of differential pressure on an inner surface and an outer surface of a nonresilient shim.
Figures 6A, 6B:
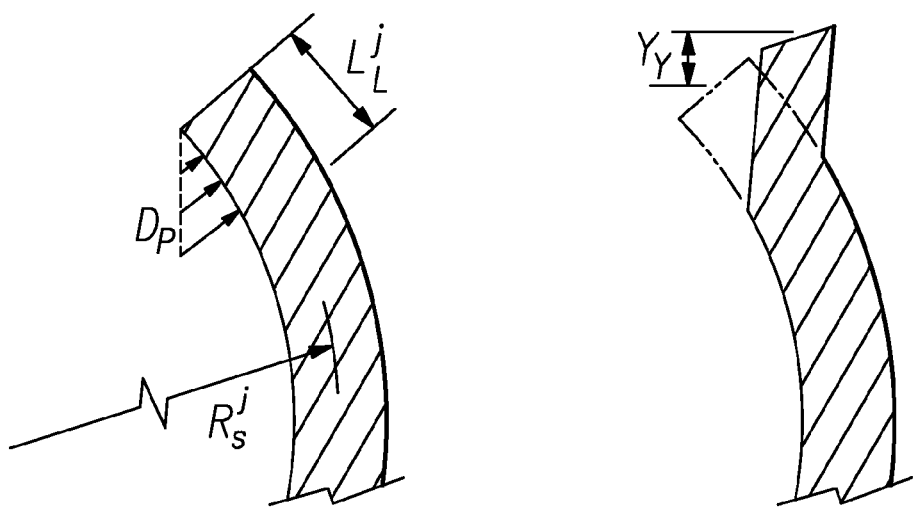
FIG. 6A is an expanded schematic sectional view of an undeformed nonresilient shim.
FIG. 6B is an expanded schematic sectional view of the nonresilient shim of FIG. 6A in a deformed condition to illustrate the deformation mechanism which generates the primary shim stress.

Step 3. Use conventional spherical bearing methodology to design first elastomeric layer 36A (FIG. 4). For further understanding of other aspects of the conventional spherical bearing methodology, attention is directed to U.S. patent application Ser. No. 11/959,949 filed Dec. 19, 2007 and entitled UNIFORM FATIGUE LIFE SPHERICAL ELASTOMERIC BEARING which is assigned to the assignee of the instant application and which is hereby incorporated herein in its entirety. Elastomer thickness ($T_e^i$), elastomer shear modulus ($G_e^i$), axial compression induced shear stress ($\gamma_{ai}$).

Step 4. Assume metal shim thickness ($T_s^j$)

Step 5. Repeat Step 3 for the next layer $$(T_e^{i+1}, G_e^{i+1}, \gamma_{ai+1})$$

Step 6. Apply design module equations 1-9 in order to determine nonresilient shim thickness ($T_s^j$) that satisfies material strength allowables (e.g., specific to the material being used in the shim).

Step 7. Finalize with existing design module equations 1-9. It is noted that the calculated nonresilient shim thickness determined in Step 6 may be modified by addition of another elastomeric layer, and thus Step 7 allows a further refinement of the determined nonresilient shim thickness ($T_s^j$) from Step 6.

$$(T_e^{i+1}, G_e^{i+1}, \gamma_{ai+1})$$

Step 8. Iterate from Step 4 until all elastomeric layers 36 and nonresilient shims 38 satisfy loads, motions and allowable constraints, e.g., material strength allowables and the constraints described in the aforementioned U.S. patent application Ser. No. 11/959,949 filed Dec. 19, 2007 and entitled UNIFORM FATIGUE LIFE SPHERICAL ELASTOMERIC BEARING.

Figure 7B:
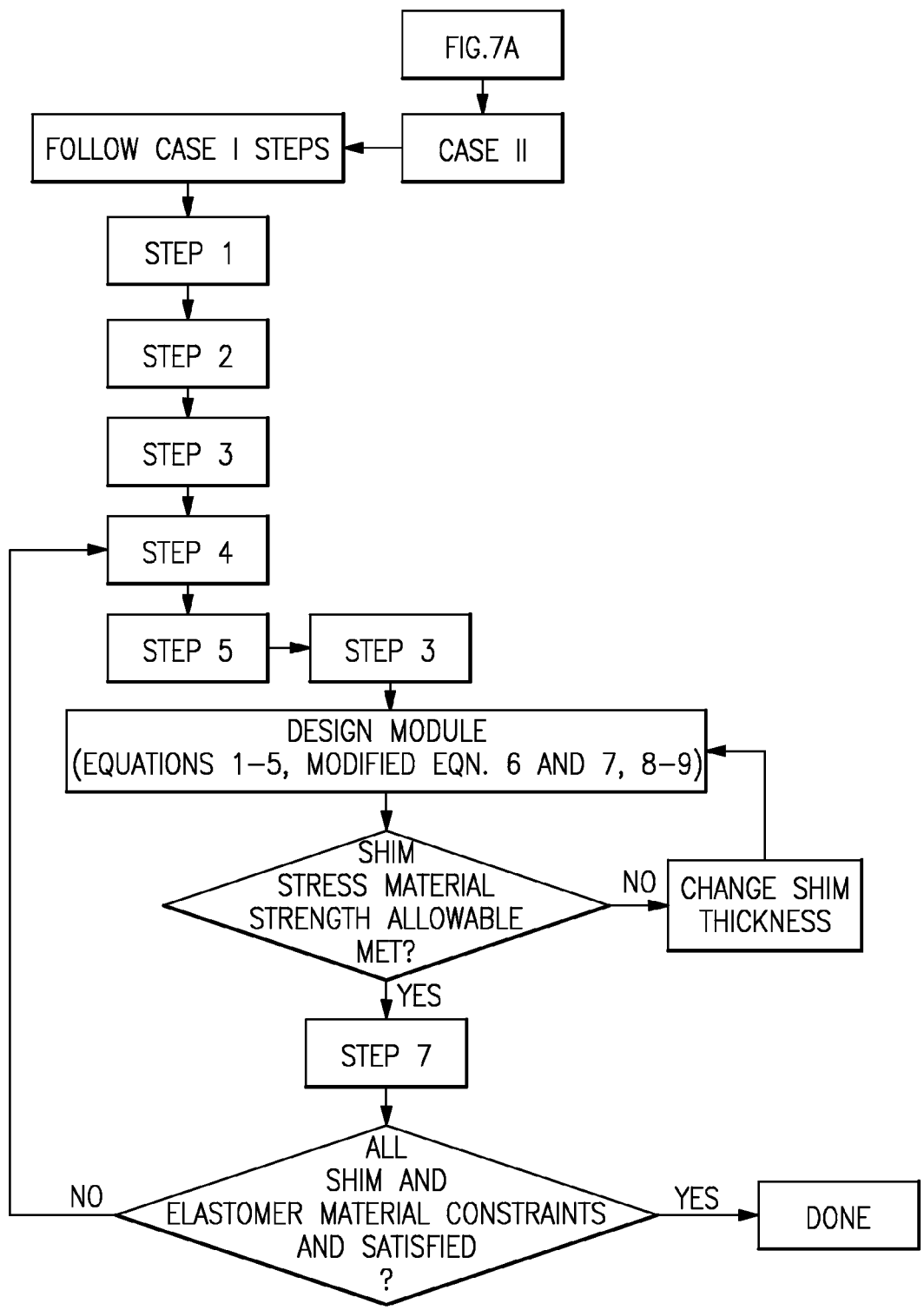
FIG. 7B is a flow chart illustrating a calculation procedure for calculation of Compressive Load ($T_c$); Torsional Motion ($\theta$); And Cocking Motions ($\beta$) according to one non-limiting embodiment.

Referring to FIG. 7B, utilizing the Equations described above, another calculation procedure according to one non-limiting embodiment of the present invention is as follows:

Case II

Compressive Load ($T_c$); Torsional Motion ($\theta$); And Cocking Motions ($\beta$) Calculation Follow Case I Module but:

Adjust equation 6 to reflect the change in differential support zone due to the cocking.

$$L_L = (B_I - (B_o - \beta)) \frac{\pi}{180} \left(\frac{R_s}{N_s}\right) Q \cdot \upsilon$$

Adjust equation 7 to reflect the radial loading $T_c \cdot \sin \beta$ due to the cocking motion with associated radial and axial compression induced shear strain.

$$D_P = 2 \cdot (\gamma_a + \gamma_r) \cdot G \cdot \frac{L_L}{T_e}$$

Modification of equations 6 and 7 incorporate blade flapping in the stress calculation. Follow Case I Design Optimization Module where the shim stress equations are combined to equation 10 until all elastomeric layers and nonresilient shims satisfy load, motions and allowable constraints.

It should be understood that the instructions are equivalent for a solid bearing and a bearing with a central opening. It should also be understood that an elastomeric bearing with any number of layers may be calculated by the method herein.

By way of illustration, an elastomeric bearing 30 with three nonresilient shims 38 according to one non-limiting embodiment, has inputs delineated in the chart below:

| Inputs | |
|---|---|
| Bearing Parameters | |
| Side Angle, ALPHA (deg) | 27 |
| Inner Angle Bi (deg) | 54.00 |
| Inner Radius Ri (in) | 7.25 |
| Shim Layers | |
| Shim Elastic Modulus, E (psi) | 3.00E+07 |
| Shim Poisson's Ratio, v | 0.3 |
| Shim Hoop Stress Allowable (psi) | 10,000 |
| Applied Loads and Motions | |
| Axial Loads, Paxial (lbf) | 122,500 |
| Torsional Rotation, theta (deg) | 1.68 |
| Flapping Rotation, beta (deg) | 0.96 |

To provide the following properties:

| Final Bearing Properties | |
|---|---|
| Geometry | |
| Inner Radius Ri (in) | 7.25 |
| Outer Radius Ro (in) | 7.90 |
| Inner Angle Bi (deg) | 54.00 |
| Outer Angle Bo (deg) | 51.62 |
| Side Angle, ALPHA (deg) | 27 |
| Average Shim Thickness (in) | 0.040 |
| Total Elastomer Thickness, Tt (in) | 0.531 |
| Number of shims, Ns | 3 |
| Number of Elastomer Layers | 4 |

Figure 8:
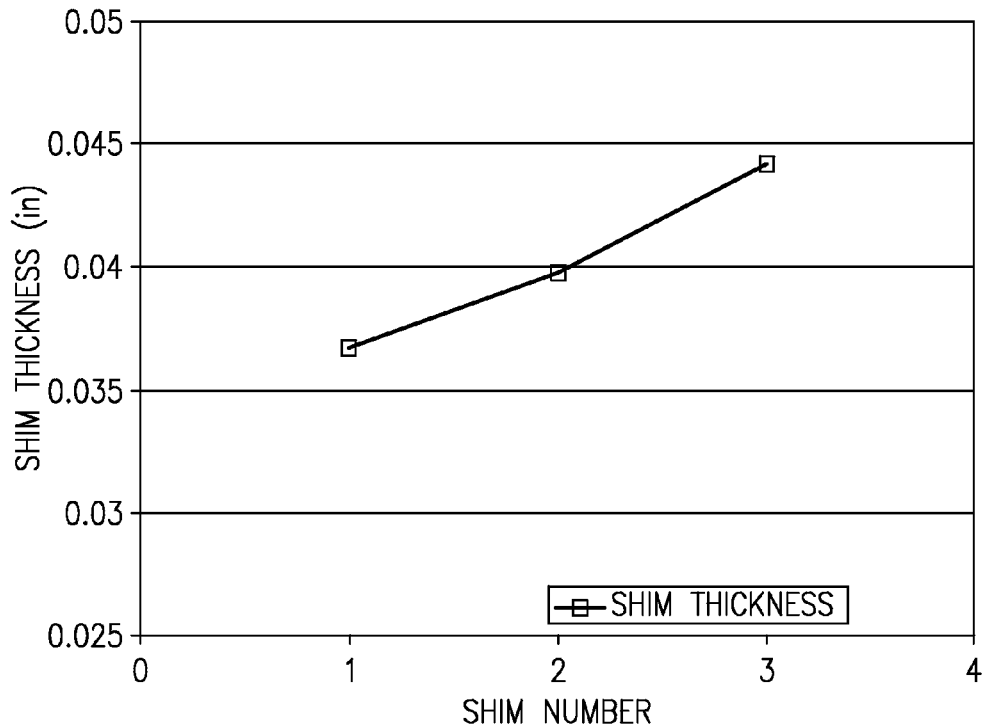
FIG. 8 is a graph representing a shim thickness relative a shim number for one elastomeric bearing with three shim layers according to one non-limiting embodiment of the present invention.
Figure 9:
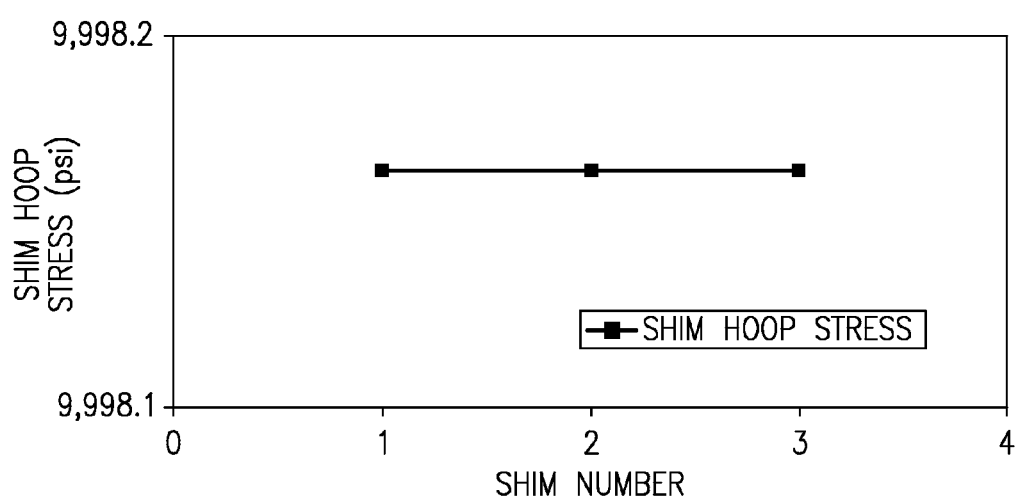
FIG. 9 is a graph of the elastomeric bearing of FIG. 3 illustrating an essentially equivalent shim stress at each of the three shim layers.

These properties provide a nonresilient shim 38A, 38B, 38C which increase in thickness by outer layer (FIG. 8) such that each nonresilient shim 38A, 38B, 38C is subject to an essentially equivalent stress level (FIG. 9).

It should be noted that a computing device can be used to implement various functionality and calculations of the design module equations to determine that each of the nonresilient shims satisfy the desired loads, motions, allowables and other requirements as described herein. In terms of hardware architecture, such a computing device can include a processor, memory, and one or more input and/or output (I/O) device interface(s) that are communicatively coupled via a local interface. The local interface can include, for example but not limited to, one or more buses and/or other wired or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

The processor may be a hardware device for executing software, particularly software stored in memory. The processor can be a custom made or commercially available processor, a central processing unit (CPU), an auxiliary processor among several processors associated with the computing device, a semiconductor based microprocessor (in the form of a microchip or chip set) or generally any device for executing software instructions.

The memory can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory may incorporate electronic, magnetic, optical, and/or other types of storage media. Note that the memory can also have a distributed architecture, where various components are situated remotely from one another, but can be accessed by the processor.

The software in the memory may include one or more separate programs, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory.

The Input/Output devices that may be coupled to system I/O Interface(s) may include input devices, for example but not limited to, a keyboard, mouse, scanner, microphone, camera, proximity device, etc. Further, the Input/Output devices may also include output devices, for example but not limited to, a printer, display, etc. Finally, the Input/Output devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc.

When the computing device is in operation, the processor can be configured to execute software stored within the memory, to communicate data to and from the memory, and to generally control operations of the computing device pursuant to the software. Software in memory, in whole or in part, is read by the processor, perhaps buffered within the processor, and then executed.

It should be understood that relative positional terms such as "forward," "aft," "upper," "lower," "above," "below," and the like are with reference to the normal operational attitude of the vehicle and should not be considered otherwise limiting.

It should be understood that although a particular component arrangement is disclosed in the illustrated embodiment, other arrangements will benefit from the instant invention.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The disclosed embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A method of calculating a nonresilient shim thickness for a spherical elastomeric bearing comprising:
   determining a first thickness of a first of a multitude of nonresilient shim layers to satisfies a first set of criteria;
   determining a second thickness of a second of the multitude of nonresilient shim layers outboard of the first of the multitude of nonresilient shim layers to satisfies a second set of criteria, the second thickness different than the first thickness to produce a spherical elastomeric bearing generating an essentially equivalent stress to each nonresilient shim layer.

2. A method as recited in claim 1, further comprising:
   utilizing material strength allowables of each of the multitude of nonresilient shim layers at least in part as the first criteria and the second criteria.

3. A method as recited in claim 1, further comprising:
   sequentially iterating the thickness of each of the multitude of nonresilient shim layers until the multitude of nonresilient shim layers to generate an essentially equivalent stress in each of the multitude of nonresilient shim layers.

4. A method as recited in claim 1, wherein
   arranging each of the multitude of nonresilient shim layers relative to a bearing focal point such that each of the multitude of nonresilient shim layer increase in thickness relative a first inboard nonresilient shim layer.

5. A method of calculating a nonresilient shim layer thickness for a spherical elastomeric bearing comprising:
   determining a first shim thickness of a first of a multitude of nonresilient shim layers in the spherical elastomeric bearing, each of the multitude of nonresilient shim layers sandwiched between a first pair of elastomeric layers;
   determining a elastomeric layer thickness for the first pair of elastomeric layers; and
   modifying the first shim thickness and the elastomeric layer thickness in response to an addition of a second a of the multitude of nonresilient shim layers and a second pair of elastomeric layers outboard of the first of the multitude of nonresilient shim layers and the first pair of elastomeric layers, the modifying continuing until each of the multitude of nonresilient shim layers have an essentially equivalent stress.

6. A method as recited in claim 5, further comprising:
   determining an axial load for the spherical elastomeric bearing in a direction parallel to a Z axis of rotation;
   determining a radial load in a radial direction for the spherical elastomeric bearing; and
   determining a vibratory pitch motion (θ) angle which rotates about the Z axis for the spherical elastomeric bearing.

7. A method as recited in claim 5, further comprising:
   utilizing a centrifugal force from a rotor blade as the axial load; and
   utilizing a shear load on the rotor blade as the radial load.

8. A method of calculating a nonresilient shim thickness for a spherical elastomeric bearing comprising:
   determining a first thickness of a first of a multitude of nonresilient shim layers to satisfies a first set of criteria;
   determining a second thickness of a second of the multitude of nonresilient shim layers outboard of the first of the multitude of nonresilient shim layers to satisfies a second set of criteria, the second thickness different than the first thickness;
   adjusting the shim hoop stress for each of the multitude of nonresilient shim layers to satisfy:

$$\sigma_\theta = \frac{4 \cdot (B_l - (B_o - \beta)) \cdot (\gamma_a + \gamma_r) \cdot G \cdot D \cdot \pi \cdot E \cdot \cos(B_s) \cdot R_s}{1800 \cdot T_e \cdot R_s \cdot \sin(B_s) \cdot N_s}.$$

-continued $$\frac{T}{\left(\frac{T_T}{N_s+1}\right)} \cdot \frac{T_T}{N_s \cdot \hat{T}_s + T_T} \cdot \left[\left[\frac{E \cdot T_s [\cos(B_s)]^2}{4 \cdot \frac{E \cdot T_s^3}{12 \cdot (1-\mu^2)} \cdot [R_s \cdot \sin(B_s)]^2}\right]^{1/4}\right]^{-3}$$

to produce a spherical elastomeric bearing which generates an essentially equivalent stress to each nonresilient shim layer,
where:

$\hat{T}_e$ = Average Elastomer Thickness $\frac{(T_i + T_{i+1})}{2}$ (in)

$T_s$=Shim Thickness $T_s^j$ (in)
$\hat{T}_s$=Average Shim Thickness (in)
$\mu$=Shim Poison Ratio
$E$=Shim Modulus of Elasticity (psi)
$R_s$=Shim Median Spherical Radius $R^j$ (in)

$G$ = Average Elastomer Shear Modulus $\frac{(G_i + G_{i+1})}{2}$ (psi)

$B_I$=Bearing Inner Wrap Angle (deg)
$B_O$=Bearing Outer Wrap Angle (deg)
$N_s$=Total Number of Shims
$B_s$=Outer Wrap Around Angle of Shim $B_s^j$ (deg)
$D$=Shim Bending Stiffness Term (lb-in)
$B_{ET}$=Shim Geometric Stiffness Term (in)
$\gamma$=Average Elastomer Compression Induced Shear Strain (in/in)/100
$T_T$=Total Bearing Elastomer Thickness (in)
$Q$=Averaging Coefficient of Bearing (non-dimensional)
$\nu$=Averaging Coefficient of Elastomer To Shim Context (non-dimensional)
$L_L$=Unsupported Spherical Arc of Shim $L_L^i$ (see FIG. 4)
$Y_Y$=Radial Deflection of Shim $Y_Y^i$ (see FIG. 4)
$\sigma_\theta$=Shim Hoop Stress $\sigma^{\theta i}$ (psi)
$D_P$=Differential Resultant Pressure Load On Unsupported Spherical Arc of Shim $L_L^i$
$T_c$=Axial Compressive Load (lb)
$\theta$=Torsional Motion Angle (deg))
$\beta$=Cocking Motion Angle (deg)
$T_c \cdot \sin \beta$=Radial Load (lb)
$R_I$=Bearing Inner Radius (in)
$R_O$=Bearing Outer Radius (in)
$T_e^i$=Elastomer Thickness (in)
$\alpha$=Bearing Outer Taper Angle (deg).

\* \* \* \* \*